United States Patent
Zou et al.

(10) Patent No.: US 10,444,027 B2
(45) Date of Patent: Oct. 15, 2019

(54) PARKING LOT ENTRANCE RECOGNITION METHOD AND SYSTEM

(71) Applicant: FUJIAN UNIVERSITY OF TECHNOLOGY, Fuzhou, Fujian (CN)

(72) Inventors: Fumin Zou, Fujian (CN); Xinhua Jiang, Fujian (CN); Lvchao Liao, Fujian (CN); Yanling Deng, Fujian (CN); Xiang Xu, Fujian (CN); Rong Hu, Fujian (CN); Quan Zhu, Fujian (CN); Weidong Fang, Fujian (CN); Zibiao Chen, Fujian (CN); Zhenhua Gan, Fujian (CN); Hongjie Zheng, Fujian (CN); Xianghai Ge, Fujian (CN); Maolin Zhang, Fujian (CN); Yun Chen, Fujian (CN)

(73) Assignee: FUJIAN UNIVERSITY OF TECHNOLOGY, Fuzhou (CN)

( * ) Notice: Subject to any disclaimer, the term of this patent is extended or adjusted under 35 U.S.C. 154(b) by 0 days.

(21) Appl. No.: 16/088,814

(22) PCT Filed: Dec. 12, 2016

(86) PCT No.: PCT/CN2016/109382
§ 371 (c)(1),
(2) Date: Sep. 26, 2018

(87) PCT Pub. No.: WO2017/166866
PCT Pub. Date: Oct. 5, 2017

(65) Prior Publication Data
US 2019/0107413 A1 Apr. 11, 2019

(30) Foreign Application Priority Data
Mar. 29, 2016 (CN) .......................... 2016 1 0186662

(51) Int. Cl.
G08B 1/00 (2006.01)
G01C 21/36 (2006.01)
(Continued)

(52) U.S. Cl.
CPC ........ G01C 21/3685 (2013.01); G01S 5/0027 (2013.01); G01S 19/40 (2013.01);
(Continued)

(58) Field of Classification Search
None
See application file for complete search history.

(56) References Cited

U.S. PATENT DOCUMENTS 9,215,560 B1 * 12/2015 Jernigan ................ H04W 4/021
2006/0089790 A1 * 4/2006 Dupuis .................. G07C 5/008
701/408
2018/0202816 A1 * 7/2018 Kesting .................. G01C 21/32

OTHER PUBLICATIONS

Natalia Marmasse et al., Location-aware information delivery with comMotion, Handheld and Ubiquitous Computing: Second International Symposium, Sep. 27, 2000, pp. 157-171.

* cited by examiner

*Primary Examiner* — Julie B Lieu

(57) ABSTRACT

A parking lot entrance recognition method comprises the steps: reading GPS data of all vehicles appearing in a specified region within a specified time one-by-one; acquiring discontinuity points after it is confirmed that vehicle position information is lost; and comparing the discontinuity frequency of each discontinuity point with a frequency threshold to determine whether or not the discontinuity point is an entrance of an underground parking lot. In this way, the entrances of parking lots can be rapidly positioned, so that drivers can park conveniently and can also drive purposefully; and meanwhile, based on the analysis of the GPS data, the positioning accuracy is higher.

5 Claims, 3 Drawing Sheets

(51) Int. Cl.
  *G08G 1/01* (2006.01)
  *G08G 1/127* (2006.01)
  *G01S 19/40* (2010.01)
  *G08G 1/065* (2006.01)
  *G08G 1/14* (2006.01)
  *G08G 1/00* (2006.01)
  *G01S 19/42* (2010.01)
  *G01S 5/00* (2006.01)

(52) U.S. Cl.
  CPC ............... *G01S 19/42* (2013.01); *G08G 1/01* (2013.01); *G08G 1/065* (2013.01); *G08G 1/127* (2013.01); *G08G 1/143* (2013.01); *G08G 1/146* (2013.01); *G08G 1/207* (2013.01)

PARKING LOT ENTRANCE RECOGNITION METHOD AND SYSTEM

TECHNICAL FIELD

The invention relates to the technical field of GPS positioning, in particular to a parking lot entrance recognition method and system.

DESCRIPTION OF RELATED ART

Nowadays, as more and more urban residents go out by driving cars, the issue of vehicle parking is drawing more and more attention of the public, and rapid recognition of roadside parking spaces and underground parking lots is of great application value for settling this issue. Rapid recognition results about the distribution of roadside parking spaces and the entrances of underground parking lots can assist drivers in path planning, so that convenience is brought to the drivers, time and labor are saved for the drivers, and the traffic order will not be disturbed because detouring along roads is avoided when the drivers search for parking spaces or the entrances of parking lots.

For instance, if a user wants to go to the Powerlong Plaza from the college town, the situation that the driver drives round and round near the plaza to search for the entrance of a parking lot can be avoided as long as the user is informed of the specific position of the underground parking lot of the Powerlong Plaza in advance, and thus, time is saved, and the route is shortened. In the same way, recognition of roadside parking spaces can also realize such effects, and thus, users can drive and park more purposefully.

Technical Issue

The technical issue to be settled by the invention is to provide a technical scheme for rapidly recognizing the entrances of underground parking lots so as to realize accurate positioning and to facilitate driving and parking for drivers.

Solution to the Issue

Technical Solution

The technical scheme adopted by the invention to settle the above-mentioned technical issue is to provide a parking lot entrance recognition method, comprising the following steps:

GPS data of all vehicles appearing in a specified region within a specified time are read one-by-one;

After it is confirmed that vehicle position information is lost, discontinuity points are acquired; and the discontinuity frequency of each discontinuity point is compared with a frequency threshold to determine whether or not the discontinuity point is an entrances of an underground parking lot.

To settle the above-mentioned issue, the invention further provides a parking lot entrance recognition system, comprising:

a data reading module used for reading GPS data of all vehicles appearing in a specified region within a specified time one-by-one;

a position discontinuity module used for acquiring discontinuity points after it is confirmed that vehicle position information is lost; and a comparison and determination module used for comparing the discontinuity frequency of each discontinuity point with a frequency threshold to determine whether or not the discontinuity point is an entrance of an underground parking lot.

Beneficial Effects of the Invention

Beneficial Effects

The invention has the following beneficial effects: different from the prior art, the GPS data of vehicles are acquired one-by-one; the discontinuity points are acquired after it is confirmed that the vehicle position information is lost; and the discontinuity frequency of each discontinuity point is compared with the frequency threshold to determine the positions of entrances of underground parking lots. In this way, the entrances of parking lots can be rapidly positioned, so that drivers can park conveniently and can drive purposefully; and meanwhile, based on the analysis of the GPS data, the positioning accuracy is higher.

BRIEF DESCRIPTION OF THE DRAWINGS

Description of the Several Views of the Drawings

Figure 1:
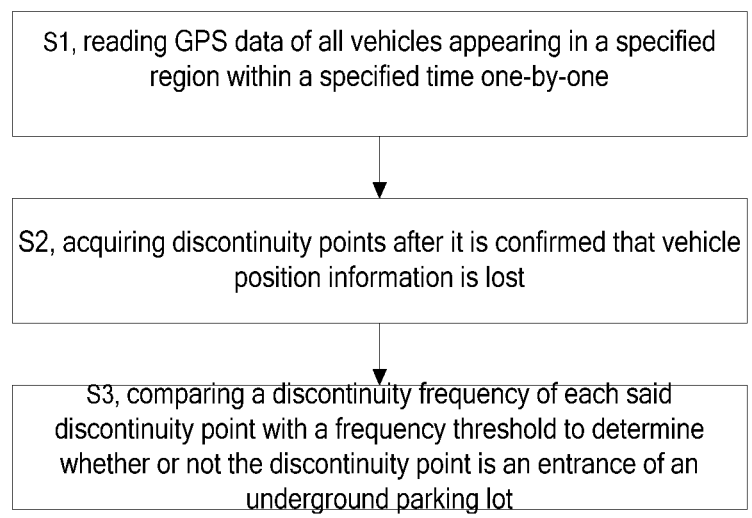
Figure 2:
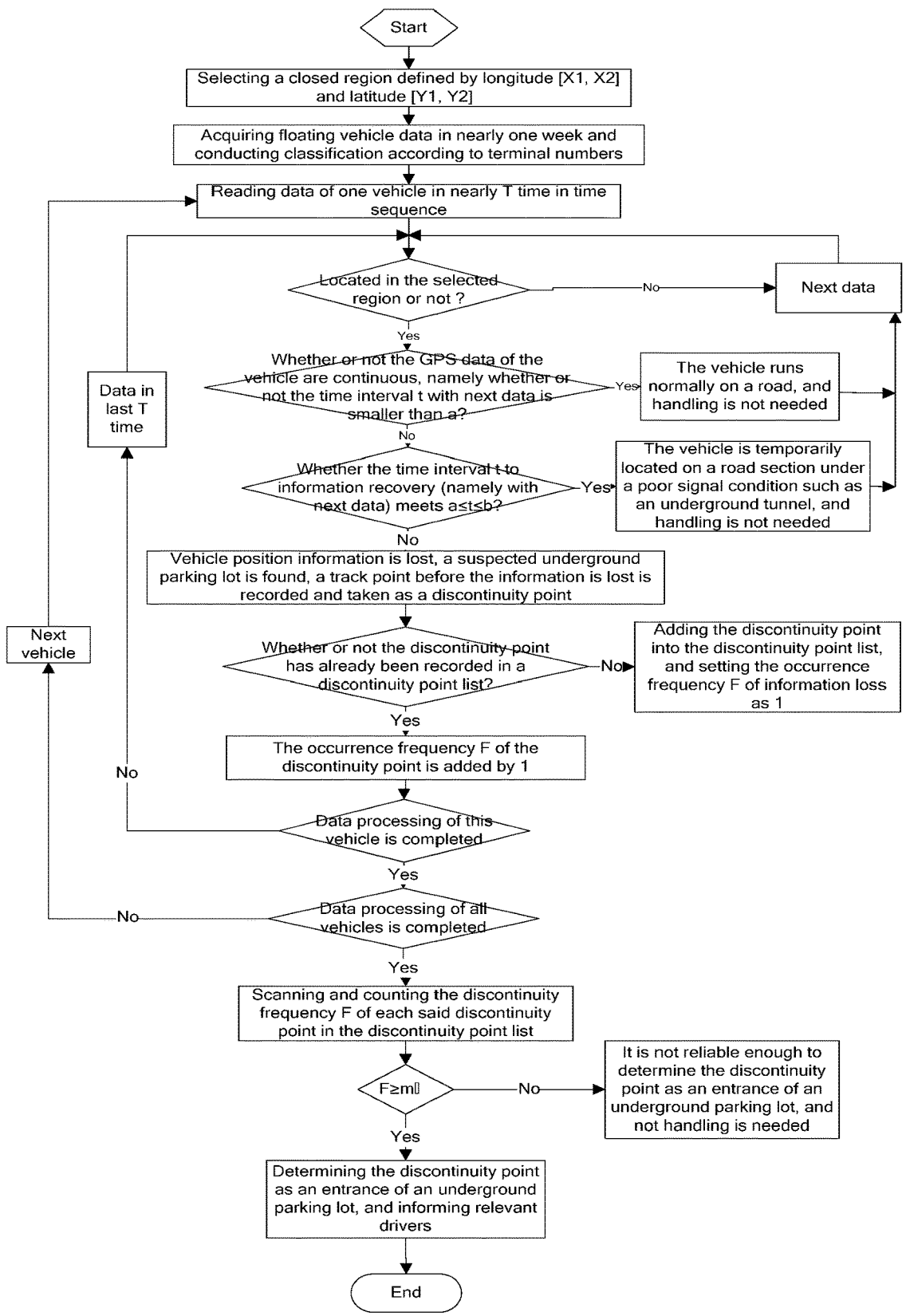
Figure 3:
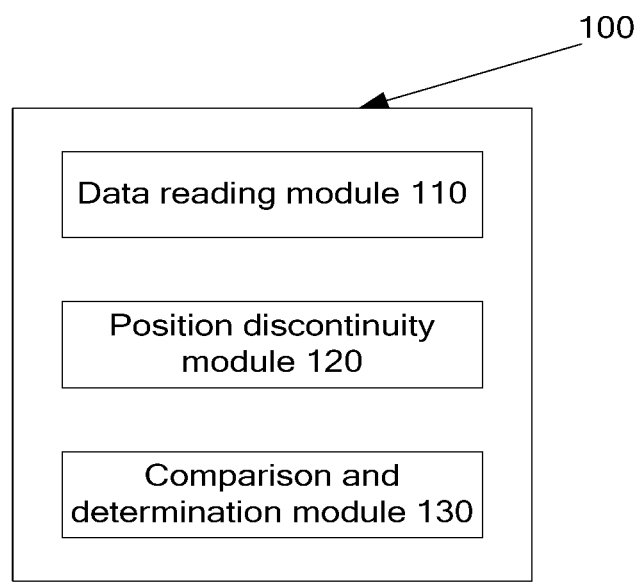

FIG. 1 is a flow diagram of a first embodiment of the method of the invention;

FIG. 2 is a flow diagram of a specific embodiment of the method of the invention;

FIG. 3 is a structural block diagram of a second embodiment of the system of the invention.

SPECIFIC OPTIMAL EMBODIMENTS

The key conception of the invention: GPS data are analyzed to acquire discontinuity points where vehicle positions are lost, and frequency comparison is conducted to determine the positions of the entrances of underground parking lots.

Referring to FIG. 1, the first embodiment of the invention provides a parking lot entrance recognition method, comprising the following steps:

S1, GPS data of all vehicles appearing in a specified region within a specified time are read one-by-one;

S2, after it is confirmed that vehicle position information is lost, discontinuity points are acquired; and S3, the discontinuity frequency of each discontinuity point is compared with a frequency threshold to determine whether or not the discontinuity point is an entrance of an underground parking lot.

Furthermore, step S1 specifically comprises the following sub-steps:

the specified region defined by specific longitude and latitude is selected;

vehicle terminal numbers appearing within the specified time are acquired, and the vehicles are classified according to the terminal numbers; and the GPS data of all the vehicles within the specified time are read one-by-one in time sequence;

Wherein, the GPS data include vehicle terminal number, longitude and latitude value, vehicle type, vehicle speed, driving direction and driving state.

Furthermore, after the GPS data of one vehicle are read, whether or not the vehicle is located in the specified region at that moment is judged according to the GPS data of the vehicle; if yes, whether or not the GPS data are continuous is judged; or if not, data of the next vehicle are read.

Furthermore, in this embodiment of the invention, whether or not the GPS data are continuous is judged by judging whether or not the discontinuity time between data points is smaller than a threshold;

if yes, the GPS data are determined as continuous, and next GPS data are read;

if not, the GPS data are determined as discontinuous, and a discontinuity point is acquired and recorded.

Furthermore, after the discontinuity point is acquired, whether or not the discontinuity point has already been recorded in a discontinuity point list is judged; if yes, the discontinuity frequency F of the discontinuity point is added by 1; or if not, the discontinuity point is recorded into the discontinuity point list, and the discontinuity frequency F of the discontinuity point is set as 1.

Furthermore, the step of comparing the discontinuity frequency of each discontinuity point with the frequency threshold to judge whether or not the discontinuity point is an entrance of an underground parking lot comprises the following sub-steps:

The discontinuity frequency of each discontinuity point in the discontinuity point list is scanned and counted;

whether or not the discontinuity frequency is greater than the frequency threshold is judged;

if yes, it is determined that the position of the discontinuity point is an entrance of an underground parking lot.

First Embodiment

As shown in FIG. 2, as for the parking lot entrance recognition method in the first embodiment of the invention, a GPS module can be installed in a vehicle first, for instance, the GPS module is installed on a vehicle terminal, and statistics and analysis of GPS data of the vehicle terminal are performed by a control center; or an APP can be downloaded on the vehicle terminal, and then, statistics and analysis of the GPS data of the vehicle terminal are performed by a server. In actual application, after being acquired, the GPS data are stored in a specific server database so as to be read and researched.

A specified region defined by specific longitude and latitude (such as longitude [X1, X2] and latitude [Y1, Y2]) is selected, and every time a vehicle enters the specified region, the terminal number of the vehicle and the time when the vehicle enters the specified region are recorded. For instance, data about the specified region can be extracted from the specific server database through a condition query statement and are sequentially read according to the vehicle terminal numbers and the time, and thus, the processing speed is high.

To make statistics of the parking lot condition of the specified region, the GPS data of all vehicles that appeared in the specified region within a certain time period such as in the last one month or in the last one week are acquired, and according to the terminal numbers, the vehicles are classified, for instance, as small cars, middle-sized cars, large cars, private cars or buses; due to the fact that different types of vehicles have different requirements for parking lots, vehicles of different types can be separately analyzed to determine different parking lots such as parking lots for small cars or parking lots for large cars.

According to the time when vehicles enter the specified region, GPS data of the vehicles are sequentially read and analyzed one-by-one, wherein the GPS data include vehicle terminal number, longitude and latitude value, vehicle type, vehicle speed, driving direction, driving state and the like.

For instance, as for the first car A in a small car group, whether or not the GPS data of the first car A are continuous are judged first; if the GPS data are continuous, it indicates that the car A is not parked in this region, the data are not processed, and data of the next car B are read.

If the GPS data of the car A are discontinuous, whether or not the car A is still located in the specified region at the time when the discontinuity occurs is judged; if not, it indicates that the car A has been pulled out of the specified region at that time, and the discontinuity is ignored; or if yes, the discontinuity time t is compared with discontinuity thresholds, if $t<a$, (wherein a is a first threshold such as 5 seconds), it indicates that data are temporarily lost due to, for instance, terminal updating and restarting, the car still runs normally on the road, and this discontinuity is ignored; if $a \leq t \leq b$ (wherein b is a second threshold such as 30 seconds), it indicates that the car temporarily runs on a road section under a poor signal condition such as an underground tunnel, and the discontinuity is ignored; and if $t>b$, it indicates that the position information of the car is lost, an underground parking lot is possibly located at the position of the discontinuity, and a track point before the position information is lost is recoded and is taken as a discontinuity point.

Whether or not the discontinuity point has already be recorded in a discontinuity point list is judged; if yes, the discontinuity frequency F of the discontinuity point is added by 1; or if not, the discontinuity point is recorded into the discontinuity point list, and the discontinuity frequency F of the discontinuity point is set as 1, based on the fact that F is a variable and has an initial value of 0 in this embodiment of the invention.

After all discontinuities of the first car A are processed, the data of the second car B are read, and the judgment process is repeated. The judgment process is performed repeatedly until data of all cars in the small car group are processed.

After all discontinuity points are acquired by processing the GPS data of all the cars in the small car group through the above steps, the occurrence frequency F of each discontinuity point in the list is scanned and counted; whether or not the occurrence frequency F of each discontinuity point is greater than a frequency threshold m is judged, namely whether $T>m$ is judged specifically according to the traffic condition in different regions, wherein the frequency threshold m, for instance, can be 10; if yes, it is determined that the position of the discontinuity is an entrance of an underground parking lot, and drivers driving in the specified region are informed of the entrance of the underground parking lot through the vehicle terminal; or if not, the judgment reliability of the entrance of the underground parking lot is poor, whether or not the discontinuity is an entrance of an underground parking lot cannot be determined, and thus, the discontinuity is temporarily not regarded as an entrance of an underground parking lot.

For vehicle groups of other types, the method can be used to determine the entrances of underground parking lots of different types.

Correspondingly, as shown in FIG. 3, the second embodiment of the invention provides a parking lot entrance recognition system 100, comprising:

a data reading module 110 used for reading GPS data of all vehicles appearing in a specified region within a specified time one-by-one;

a position discontinuity module 120 used for acquiring discontinuity points after it is confirmed that vehicle position information is lost; and a comparison and determination module 130 used for comparing the discontinuity frequency of each discontinuity point with a frequency threshold to determine whether or not the discontinuity point is an entrance of an underground parking lot.

Wherein, the data reading module 110 is specifically used for:

selecting the specified region defined by specific longitude and latitude;

acquiring vehicle terminal numbers appearing within the specified time and classifying the vehicles according to the terminal numbers;

reading the GPS data of all the vehicles in a first time period one-by-one in time sequence;

wherein, the GPS data include vehicle terminal number, longitude and latitude value, vehicle type, vehicle speed, driving direction, driving state and the like.

The position discontinuity module 120 is specifically used for:

judging whether or not the GPS data of one vehicle are continuous after the GPS data of the vehicle are read;

if yes, data of the next vehicle are read;

if not, whether or not each of the discontinuity point appears in the specified region is judged one-by-one;

if the discontinuity point appears in the specified region, whether or not the discontinuity time of the discontinuity point is smaller than a threshold is judged;

if yes, data of the next discontinuity point are read;

if not, the discontinuity point is recorded.

After the discontinuity point is acquired, whether or not the discontinuity point has already been recorded in a discontinuity point list is judged;

if yes, the discontinuity frequency F of the discontinuity point is added by 1;

if not, the discontinuity point is recorded into the discontinuity point list, and the discontinuity frequency F of the discontinuity point is set as 1.

The comparison and determination module is specifically used for:

scanning and counting the discontinuity frequency of each discontinuity point in the discontinuity point list; and judging whether or not the discontinuity frequency is greater than a frequency threshold;

if yes, it is determined that the position of the discontinuity point is an entrance of an underground parking lot; or if not, an entrance of an underground parking lot fails to be determined.

The invention is different from the prior art in the following aspects: the GPS data of vehicles appearing in the specified region within the specified time are acquired, the discontinuity points are determined by judging the data state according to the data discontinuity condition, whether the position of each discontinuity point is an entrance of an underground parking lot is determined according to the discontinuity frequency of the discontinuity point, and vehicles driving into this region are informed of the position information. Meanwhile, the vehicles are grouped according to the terminal numbers so that parking lots of different types can be recognized, and the accuracy is improved. In this way, the entrances of parking lots can be rapidly positioned, so that drivers can park conveniently and can also drive purposefully; and meanwhile, based on the analysis of the GPS data, the positioning accuracy is higher.

The invention claimed is:

1. A parking lot entrance recognition system, comprising:
a data reading module used for reading GPS data of all vehicles appearing in a specified region within a specified time one-by-one;
a position discontinuity module used for acquiring discontinuity points after it is confirmed that vehicle position information is lost; and
a comparison and determination module used for comparing a discontinuity frequency of each said discontinuity point with a frequency threshold to determine whether or not the discontinuity point is an entrance of an underground parking lot.

2. The parking lot entrance recognition system according to claim 1, wherein the data reading module is specifically used for:
selecting the specified region defined by specific longitude and latitude;
acquiring vehicle terminal numbers appearing within the specified time and classifying the vehicles according to the terminal numbers; and
reading the GPS data of all the vehicles within a first time period one-by-one in time sequence;
wherein, the GPS data include vehicle terminal number, longitude and latitude value, vehicle type, vehicle speed, driving direction and driving state.

3. The parking lot entrance recognition system according to claim 1, wherein the position discontinuity module is specifically used for:
judging whether or not the GPS data of one said vehicle are continuous after the GPS data of the vehicle are read;
if yes, data of the next vehicle are read;
if not, whether or not each discontinuity point appears in the specified region is judged one-by-one;
if the discontinuity point appears in the specified region, whether or not a discontinuity time of the discontinuity point is smaller than a threshold is judged;
if yes, data of the next discontinuity point are read; or
if not, the discontinuity point is recorded.

4. The parking lot entrance recognition system according to claim 1, wherein the position discontinuity module is also used for:
judging whether or not each said discontinuity point has already been recorded in a discontinuity position list after the discontinuity point is acquired; if yes, the discontinuity frequency F of the discontinuity point is added by 1; or
if not, the discontinuity point is recorded into the discontinuity point list, and the discontinuity frequency F of the discontinuity point is set as 1.

5. The parking lot entrance recognition system according to claim 1, wherein the comparison and determination module is specifically used for:
scanning and counting the discontinuity frequency of each said discontinuity point in the discontinuity point list; and
judging whether or not the discontinuity frequency is greater than the frequency threshold;
if yes, it is determined that the position of the discontinuity point is an entrance of an underground parking lot; or
if not, an entrance of an underground parking lot fails to be determined.

* * * * *